United States Patent [19]

Cliffe

[11] 4,141,446
[45] Feb. 27, 1979

[54] TAPE CASSETTES STORAGE AND DISPLAY

[75] Inventor: Ian Cliffe, Crawley, England

[73] Assignee: Garrod and Lofthouse Limited, London, England

[21] Appl. No.: 808,957

[22] Filed: Jun. 22, 1977

Related U.S. Application Data

[63] Continuation-in-part of Ser. No. 801,918, May 31, 1977.

[30] Foreign Application Priority Data

Jun. 22, 1976 [GB] United Kingdom ............... 25893/76
Jan. 17, 1977 [GB] United Kingdom ................. 1794/77
Jan. 28, 1977 [GB] United Kingdom ................. 3670/77

[51] Int. Cl.² .......................................... B65D 85/672
[52] U.S. Cl. .................................. 206/387; 206/45.14; 206/482; 206/487; 206/493
[58] Field of Search ............... 206/387, 493, 228, 482, 206/487, 45.14

[56] References Cited

U.S. PATENT DOCUMENTS

| | | | |
|---|---|---|---|
| 1,973,641 | 9/1934 | Locke, Jr. | 206/493 |
| 2,913,106 | 11/1959 | Colgate, Jr. | 206/228 |
| 3,025,958 | 3/1962 | Snape | 206/228 |
| 3,272,325 | 9/1966 | Schoenmakers | 220/23 |
| 3,896,929 | 7/1975 | Mills | 206/493 |
| 3,998,324 | 12/1976 | Roccaforte | 206/493 |

Primary Examiner—William T. Dixson, Jr.
Attorney, Agent, or Firm—Scrivener, Parker, Scrivener and Clarke

[57] ABSTRACT

A device for mounting a cassette box for storage and/or display purposes comprises a planar base part and a flap hingedly connected to the base part and extending within the periphery of the base part, the flap having at least one opening therein for engagement with a locating stud of the cassette box, the flap being dimensioned to be received and trapped in a cassette box with the opening therein engaged with the locating stud to mount the cassette box in the device.

24 Claims, 7 Drawing Figures

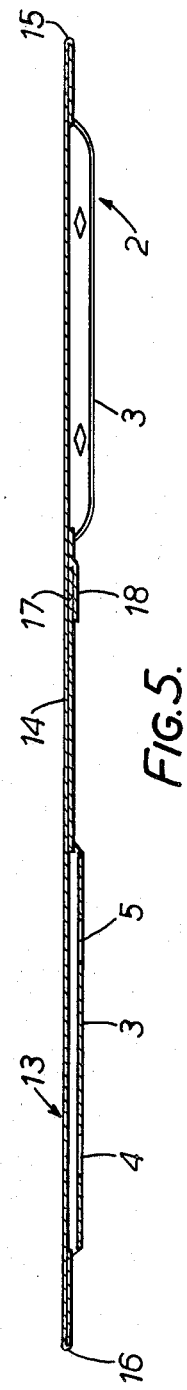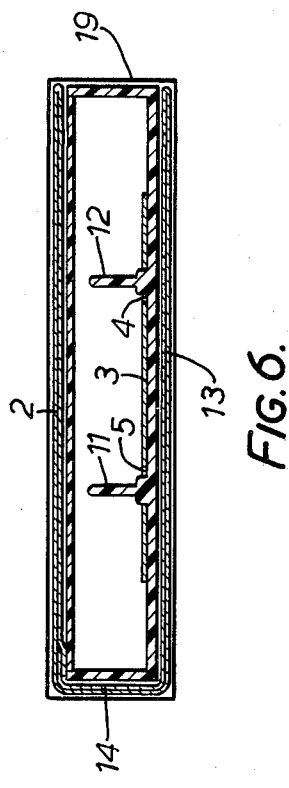

TAPE CASSETTES STORAGE AND DISPLAY

This is a continuation-in-part of application Ser. No. 801,918 filed May 31, 1977.

This invention relates to devices for the storage and/or display of tape cassette boxes.

The term "cassette box" as used herein means a box for housing a magnetic recording tape cassette and having two locating studs spaced to be received in the spindle apertures of a cassette mounted in the box.

According to the invention there is provided a device for mounting a cassette box for storage and/or display purposes, the device comprising a base part and a flap extending from said base part, said flap having at least one opening therein and being dimensioned such that a cassette box can be releasably mounted on the device with said flap trapped within the box and at least one locating stud thereof extending through said opening in said flap.

The invention will be more fully understood from the following description of embodiments thereof, given by way of example only, reference being had to the accompanying drawings, wherein:

FIG. 5 is a section on the line V—V of FIG. 4;

FIG. 6 is a section on the line V—V of FIG. 4 but with a cassette box mounted on the device which is folded up round the box.

Figure 1:
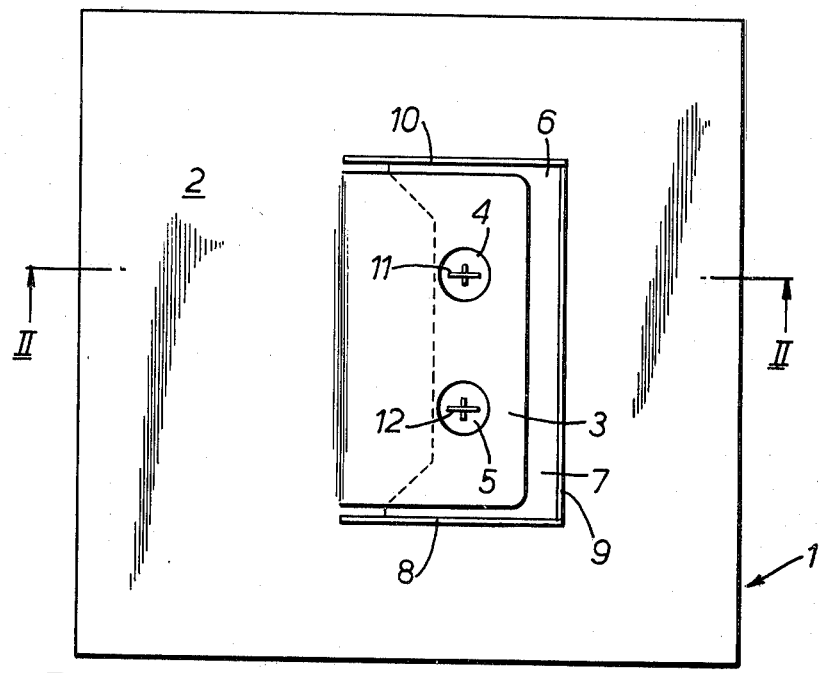
FIG. 1 is a plan view of an embodiment of a display device according to the invention having a cassette box mounted thereon, the lid of the box being omitted for the sake of clarity.

The device 1 shown in FIG. 1 comprises a planar base part 2, e.g. of sheet material such as cardboard, on which display information in the form of words and/or pictures may be reproduced. A flap 3 is hingedly connected to the base part 2 and is provided with two openings 4, 5 in the form of circular apertures. Preferably, the flap is integral with the base part and is cut out from the base part intermediate the periphery along the three sides of a rectangle, the flap being connected to the base part along the fourth side. The display information is preferably printed over the flap as well as the base part so that when the flap is lying in the plane of the base part, the display information is continuous across the base part and flap.

The cassette box 6, the lid of which has been omitted, is of the type commonly used to package prerecorded magnetic tape cassettes for sale and includes a generally planar base 7 and upstanding side walls 8, 9 and 10 on three sides of the base. Side walls 8 and 10 project beyond the edge of the base to form mounting points for the lid. Two locating studs 11, 12 extend from the base 7 and are dimensioned to be received in the spindle apertures of a cassette housed within the box, to prevent rotation of the cassette spools during storage.

As can be seen from FIG. 1, to mount the box 6 on the device 1 the base 7 of the box is placed on the base part 2 of the display card and the flap 3 is located over the base of the box with the studs 11, 12 extending through the apertures 4, 5. A cassette (not shown) is then placed in the base and the box closed or, in the alternative, the box is closed without a cassette. In either event, the box is retained on from the card because of the engagement of the studs with the apertures of the flap. The box may be removed from the card without damage to the card by the reverse of this procedure.

It will be noted that the device can be used in three different ways. Firstly, with no cassette box mounted on the flap and the flap located in the plane of the base part, the device may be displayed freely in a shop to give information about cassettes held in stock by the shop, in the same way as record sleeves are commonly displayed. Secondly, the cassette box with a cassette may be mounted on the flap and the device displayed for self selection by customers. Thirdly, the cassette box without the cassette may be mounted on the flap and displayed for self selection by customers but here there is no fear of the cassette being stolen.

It will be noted that the retailer may readily change from one display mode to another. Accordingly, it is envisaged that display devices and cassette boxes will be supplied separately to the retailer to enable him to use the devices as he desires.

The display device may be made with the base part of one or more layers of cardboard. When the base of the display device is formed from two layers of carboard which are adhered together the flap 3 is preferably only a single layer thick and is cut out of only one of the layers of the base part so that the base part extends continuously behind the flap and the reverse of the base part is uninterrupted.

Figure 2:
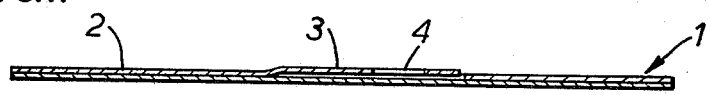
FIG. 2 is a section through the device of FIG. 1 with the box removed and taken on the line II—II of FIG. 1.
Figure 3:
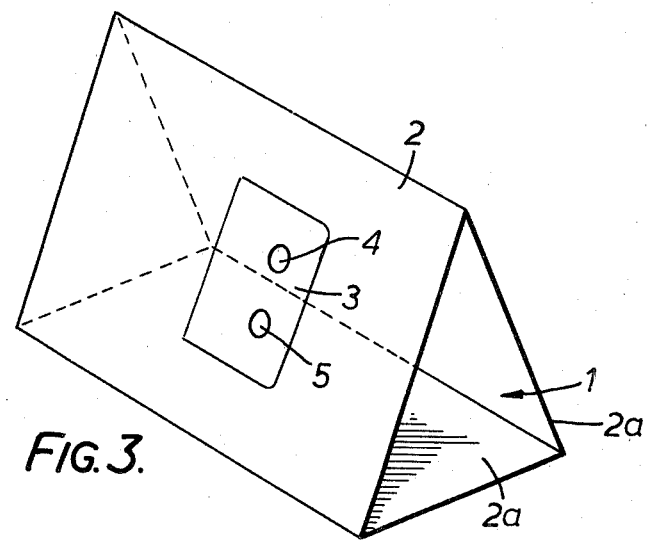
FIG. 3 is a perspective view of another embodiment of a display device.

The display card may be flat, planar, as shown in FIGS. 1 and 2, or may have any other desired configuration. For example, as shown in FIG. 3, the device may be formed of a card which is folded to provide a planar base part 2 with a flap 3 and two connected panels 2a, the part 2 and panels 2a forming a triangle so that the device can be stood up. The flap may be located at any desired point on the base part 2.

Figure 4:
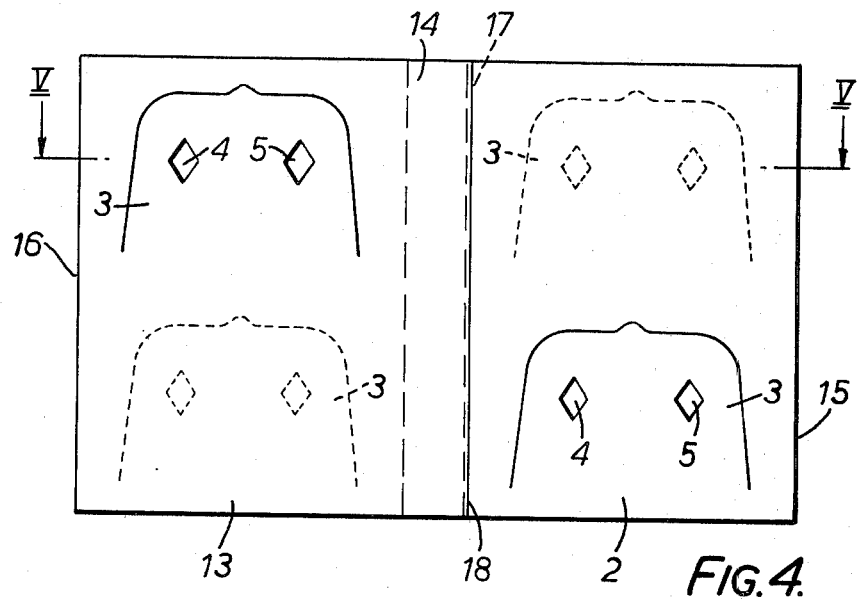
FIG. 4 is a plan view of a further embodiment of a device according to the present invention.

The device shown in FIGS. 4 to 6 comprises a planar base part 2 made for example of sheet material, e.g. cardboard, and similar to that described above. As before the base part 2 has a flap 3 hingedly connected thereto intermediate the margin of the base part and provided with two openings 4, 5 here in the form of diamond shaped apertures for engaging over the studs 11, 12 extending from the base of a cassette box. The flap 3 is so arranged on base part 2 and the base part 2 is so dimensioned that a box mounted on part 2 lies at or within the periphery of the part 2. In this embodiment the base part 2 is hingedly connected with a cover part 13 by a spine part 14 of a width such that a cassette box can be accommodated between the base and cover parts when arranged overlying one another.

The device is made from a cardboard blank which is die cut to define the flap 3 and creased to define the spine part between the base part and cover part. Preferably, as shown, the cover, base and spine parts are each of double thickness so that the outer surface of each is continuous, i.e. is not interrupted by the die cut defining the flap 3 which is formed in the inner thickness of the base part 2. Such a device may be made from a single blank which is die cut to define the flap 3 and creased to provide folds at edges 15, 16 of the cover and base part as well as folds defining the spine part 14. The end edges 17, 18 of the blank are overlapped adjacent one side of the spine and glued together. The two thicknesses of the base and cover parts are glued together at the periphery of each part.

In a modification, the part of the blank providing the inner layer of spine part 14 and the overlapped portion 17 is omitted so that the inner layers of both the cover and base parts end adjacent the spine part 14 which comprises a single layer. One or both of the inner layers of the cover and base parts is not adhered to the corresponding outerlayer so that the two layers will open out, pivoting about the fold defining the outer edge of the part. Thus the inner facing surfaces of both layers of the part are available for printing and can, for example, be printed with information relating to the recording on the cassette contained in the device. This can avoid the need to provide a separate paper insert in the cassette box bearing the same information.

In a further modification, if additional space is required for printed information, additional panels may be integrally connected to the free edge of the inner layer of the cover panel, which additional panels are folded to tie between the cover panel and the cassette box.

If the device is to accommodate a single cassette box, the base and cover parts may be made with dimensions corresponding to those of a cassette box. Alternatively, as shown, the base and cover parts may have dimensions to accommodate two cassette boxes side by side for convenience of storage with other devices which accommodate two or more cassette boxes, as described below.

To accommodate two cassette boxes, the cover part may, as shown, be formed with a flap 3 which is arranged so that when the cover part overlies the base part the two cassettes are arranged side by side. Alternatively a second flap 3 may be provided on the base part, as shown in broken lines in FIG. 4. With this arrangement, if the flaps are so arranged that one cassette box has its hinge centrally of the base part, the two cassette boxes must be spaced apart sufficiently to allow the lid of the one cassette box to be pivoted to its open position. Alternatively the flaps may be arranged so that the hinges of the two cassette boxes each lie on an edge of the base part. In a further alternative, two cassette boxes may be accommodated one overlying the other by providing a flap as indicated in broken lines in FIG. 4 on the cover part aligned with the flap on the base part. With this arrangement the width of the spine part must be doubled to accommodate the thickness of two cassette boxes between the base and cover parts.

It will be appreciated that a device as described above may be provided with any number of flaps 3 for accommodating any number of cassette boxes, with suitable dimensioning of the cover, base and spine parts, the boxes being arranged side by side, alternately on the base and cover parts or overlying one another on the base and cover parts.

For protection during marketing, the above described device may be provided with a transparent sleeve 19 (FIG. 6) which holds the base and cover parts together. The sleeve may be made of PVC or acetate.

Where cardboard is used in making the above described devices, it may have a thickness of for example 0.014 or 0.016 and may be finished with printing and varnishing as required. For convenience the title of the recording on the tape enclosed within the device as described with reference to FIGS. 4 to 6 may be printed on the spine part so that it is visible when a plurality of such devices are arranged side by side like books in a book case.

Figure 7:
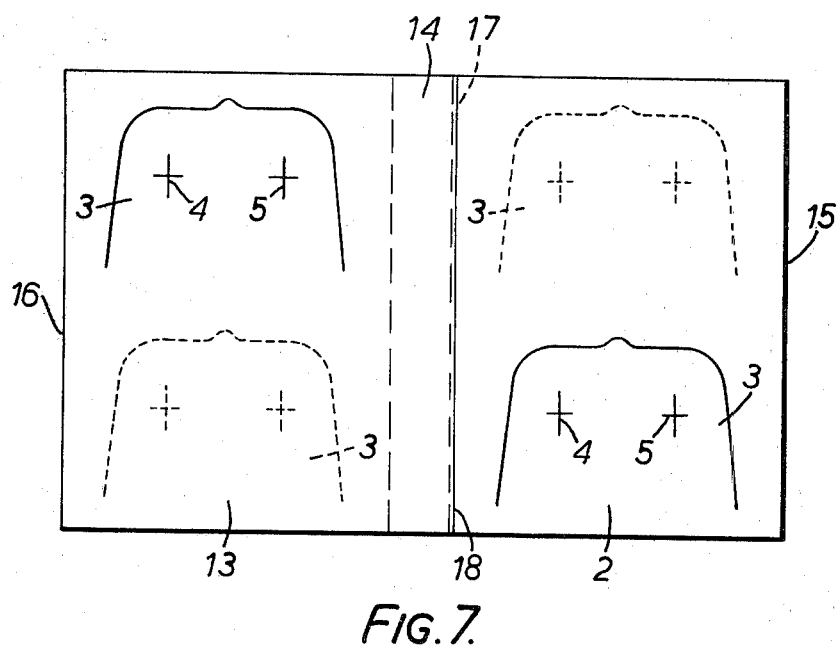
FIG. 7 is a plan view of another embodiment of a device according to the present invention.

While in the above described devices the openings 4, 5 for receiving the studs 11, 12 of a cassette box are provided by cut-outs in the flaps 3, it will be appreciated that these openings may have other shapes than those shown in FIGS. 1 to 6 and may be provided by slits in the flaps 3. In the embodiment shown in FIG. 7, which is otherwise identical with the device of FIGS. 4 to 6, the openings 4, 5 are provided by slits generally in the form of crosses. Other forms of slits may be used.

It will be appreciated that the flaps 3 may take other forms and shapes than that described. For example the flap may have the shape of a T with the upright of the T connected to the base part and the openings provided in the crossbar of the T. Alternatively the single flap 3 may be replaced by two flaps each provided with a single opening.

What is claimed is:

1. The combination of a box for a product and a device for storage and/or display of said box;
    said box comprising a base, a lid, means pivotally mounting said lid relative to said base, means defining a slit in the plane of said base, and a stud projecting from said base inwardly of said box;
    said device comprising a base part overlying the outer surface of said base of said box and a flap extending from said base part into said box through said slit, said flap overlying the inner surface of said base of said box and having an opening therein engaged over said stud to retain said flap within said box and in a position clear of said lid so as to permit opening of said box by pivoting of said lid relative to said base.

2. The combination as claimed in claim 1, wherein said flap is connected to said base part within the periphery thereof.

3. The combination as claimed in claim 1, wherein said flap is integrally connected to said base part.

4. The combination as claimed in claim 1, wherein said base part is made of at least two superimposed layers of sheet material and said flap is cut out of one layer thereof and integrally connected to that layer by a fold line.

5. The combination as claimed in claim 1, wherein said device includes panel means connected to said base part for supporting said base part in an upwardly extending position for display of said box.

6. The combination as claimed in claim 1, wherein said device includes a cover part extending over said lid of said box, said cover party being pivottally connected to said base part by a spine part of a width to accommodate said box between said base part and said cover part.

7. The combination as claimed in claim 6, wherein said base part and said cover part are both made of two layers of sheet material, said two layers of said base part being connected together along an edge thereof, said two layers of said cover part being connected together along an edge thereof, and said base part and said cover part being interconnected by said spine part which is made of at least one layer of sheet material integrally connected by fold lines to the outer layers of said base part and said cover part.

8. The combination as claimed in claim 7, wherein said spine part is made of two layers of sheet material, the outer layer being integrally connected to said outer layers of said base part and said cover part by fold lines, and the inner layer being integrally connected only to the inner layer of said cover part.

9. The combination of a box for a product and a device for storage and/or display of said box:
said box comprising a generally rectangular base defining four edges and having upstanding side walls along three edges thereof, a generally rectangular lid, means pivotally mounting said lid relative to said base along the fourth edge thereof and for pivotal movement about an axis parallel to said fourth edge of said base, said base and said lid defining therebetween a slit extending generally in the plane of said base, and stud means projecting from said base inwardly of said box;
said device comprising a base part overlying the outer surface of said base of said box, and a flap extending from said base part into said box through said slit, said flap overlying the inner surface of said base of said box and having opening means therein engaged over said stud, means to retain said flap within said box and in a position clear of said lid so as to permit opening of said box at all times by pivoting of said lid relative to said base.

10. The combination of a box for a product and a device for covering said box:
said box comprising a generally rectangular base defining four edges and having upstanding side walls along three edges thereof, a generally rectangular lid, means pivotally mounting said lid relative to said base along said fourth edge thereof and for pivotal movement about an axis parallel to said fourth edge of said base, said base and said lid defining therebetween a slit extending generally in the plane of said base, and stud means projecting from said base inwardly of said box;
said device comprising a base part overlying the outer surface of said base of said box, a flap extending from said base part into said box through said slit, said flap overlying the inner surface of said base of said box and having opening means therein engaged over said stud means a cover part overlying said lid of said box and a spine part interconnecting said cover part and said base part along said one edge of said lid, said cover part being relative to said base part about said spine part, said flap when engaged with said stud means being clear of said lid so as to permit opening of said box by pivoting movement of said lid relative to said base, and said cover part and said spine part being movable relative to said lid when the latter is pivotted to open said box.

11. The combination as claimed in claim 10, wherein said base part is made of at least two superimposed layers of sheet material and said flap is cut out of one layer thereof and integrally connected to that layer by a fold line.

12. The combination as claimed in claim 11, wherein said cover part is made of two layers of sheet material, said two layers of said base being connected together along an edge thereof, said two layers of said cover part being connected together along an edge thereof, and said base part and said cover part being interconnected by said spine part which is made of at least one layer of sheet material integrally connected by fold lines to the outer layers of said base part and said cover part.

13. The combination as claimed in claim 12, wherein said spine part is made of two layers of sheet material, the outer layer being integrally connected to said outer layers of said base part and said cover part, and the inner layer being integrally connected only to the inner layer of one of said cover part and said base part.

14. The combination as claimed in claim 10, wherein said box is adapted to receive a tape cassette and includes two studs projecting from said base inwardly of said box for engagement in the spindle apertures of said tape cassette, said flap of said device having two openings therein each for engagement of one of said studs.

15. The combination of a box for a tape cassette and a device for storage and/or display of said box:
said box comprising a generally rectangular base defining four edges and having an upstanding side wall along three of said edges thereof, a generally rectangular lid, means for pivotally mounting said lid relative to said base along said fourth edge thereof and for pivotal movement about an axis parallel to said fourth edge of said base, said lid and said base defining therebetween a slit generally in the plane of said base, and two studs projecting from said base inwardly of said box for engaging in the spindle apertures of said tape cassette when received therein;
said device comprising a base part overlying the outer surface of said base of said box and a flap extending from said base part into said box through said slit, said flap overlying the inner surface of said base of said box and having a pair of openings therein each engaged over one of said studs; to retain said flap within said box between a tape cassette when received in said box and the inner surface of said base of said box, and in a position clear of said lid so as to permit opening of said box by pivoting of said lid relative to said base.

16. The combination of claim 15 including a cover part extending over said lid of said box, and a spine part of a width to accommodate said box between said base part and said cover part and connected to said base part and said cover part along said side wall of said lid.

17. The combination as claimed in claim 16, wherein said base part is made of at least two superimposed layers of sheet material, said flap being cut out of one layer thereof and integrally connected to that layer by a fold line, said cover part is made of two layers of sheet material, and said spine part is made of at least one layer of sheet material integrally connected by fold lines to the outer layers of said base part and said cover part.

18. The combination as claimed in claim 17, wherein said spine part is made of two layers of sheet material, said outer layer being integrally connected to said outer layers of said base part and said cover part and said inner layer being integrally connected only to the inner layer of one of said base part and said cover part.

19. The combination of a box for a product and a device for covering said box:
said box comprising a generally rectangular base defining four edges, a generally rectangular lid, means mounting said lid relative to said base for pivotal movement about an axis parallel with one of said edges of said base;
said device being made of sheet material and comprising a base part overlying the outer surface of said base of said box, a cover part overlying said lid of said box, and a spine part interconnecting said base part of the said cover part of said one edge of said base of said box and about which said base part and said cover part are relatively moveable, said base part and said cover part each being made of two layers of sheet material, and means for mounting said base of said box on said base part of said device, said cover part and said spine part being free to move relative to said lid of said box in pivotting said lid relative to said base of said box to open said box.

20. The combination as claimed in claim 19, said device is made from a single blank of sheet material, said two layers of said base part being connected together along an edge thereof, said two layers of said cover part being connected together along an edge thereof, and said spine part being made of at least one layer of sheet material integrally connected by fold lines to the outer layers of said base part and said cover part.

21. The combination as claimed in claim 20, wherein said spine part is made of two layers of sheet material, the inner layer being integrally connected only to the inner layer of one of said spine part and said cover part.

22. The combination of a box for a tape cassette and a device for covering said box:

said box comprising a generally rectangular base defining four edges and having upstanding side walls along three of said edges thereof, a generally rectangular lid, and means pivotally mounting said lid relative to said base for pivotal movement about an axis parallel to said fourth edge of said base;

said device comprising a base part overlying the outer surface of said base of said box, a cover part overlying said lid of said box, and a spine part interconnecting said base part with said cover part at said fourth edge of said base of said box and above which said base part and said cover part are relatively pivotable, said cover part and said base part each being made of two layers of sheet material, and means for fixing said base of said box to said base part of said device, said spine part and said cover part being free to move relative to said lid in pivotting said lid relative to said base of said box to open said box.

23. The combination as claimed in claim 22, wherein said device is made from a single blank of sheet material, said two layers of said base part being connected together along an edge thereof, said two layers of said cover part being connected together along an edge thereof, and said spine part being made of at least one layer of sheet material integrally connected by fold lines to the outer layers of said base part and said cover part.

24. The combination as claimed in claim 23, wherein said spine part is made of two layers of sheet material, the inner layer being integrally connected only to the inner layer of one of said base part and said cover part.

* * * * *